United States Patent [19]

Watanabe et al.

[11] Patent Number: 4,735,475
[45] Date of Patent: Apr. 5, 1988

[54] OPTICAL FIBER INCLUDING CHLORINE CONTENT IN CLADDING

[75] Inventors: Minoru Watanabe; Michihisa Kyoto, both of Yokohama, Japan

[73] Assignee: Sumitomo Electric Industries, Ltd., Osaka, Japan

[21] Appl. No.: 822,135

[22] Filed: Jan. 24, 1986

[30] Foreign Application Priority Data

Jan. 25, 1985 [JP] Japan .................................. 60-13215

[51] Int. Cl.⁴ ............................................... G02B 6/00
[52] U.S. Cl. .................................. 350/96.34; 350/96.30
[58] Field of Search ............... 350/96.30, 96.34, 96.29; 65/2, 3.11, 3.12, 30.1; 501/37, 904

[56] References Cited

U.S. PATENT DOCUMENTS

| | | | |
|---|---|---|---|
| 3,459,522 | 8/1969 | Elmer et al. | 65/30.1 |
| 3,933,454 | 1/1976 | DeLuca | 65/3.11 X |
| 4,165,223 | 8/1979 | Powers | 65/2 |
| 4,492,763 | 1/1985 | Trotta et al. | 501/904 X |
| 4,643,751 | 2/1987 | Abe | 65/3.12 |

FOREIGN PATENT DOCUMENTS

| | | | |
|---|---|---|---|
| 61-40843 | 2/1986 | Japan | 501/37 |
| 2113200 | 8/1983 | United Kingdom | 65/2 X |

*Primary Examiner*—William L. Sikes
*Assistant Examiner*—Brian M. Healy
*Attorney, Agent, or Firm*—Cushman, Darby & Cushman

[57] ABSTRACT

A quartz optical fiber comprising a glass cladding made of synthetic quartz and a core in which the surface layer of the cladding contains chlorine in an amount of 0.01 to 1% by weight, which has a large average broken length.

2 Claims, 1 Drawing Sheet

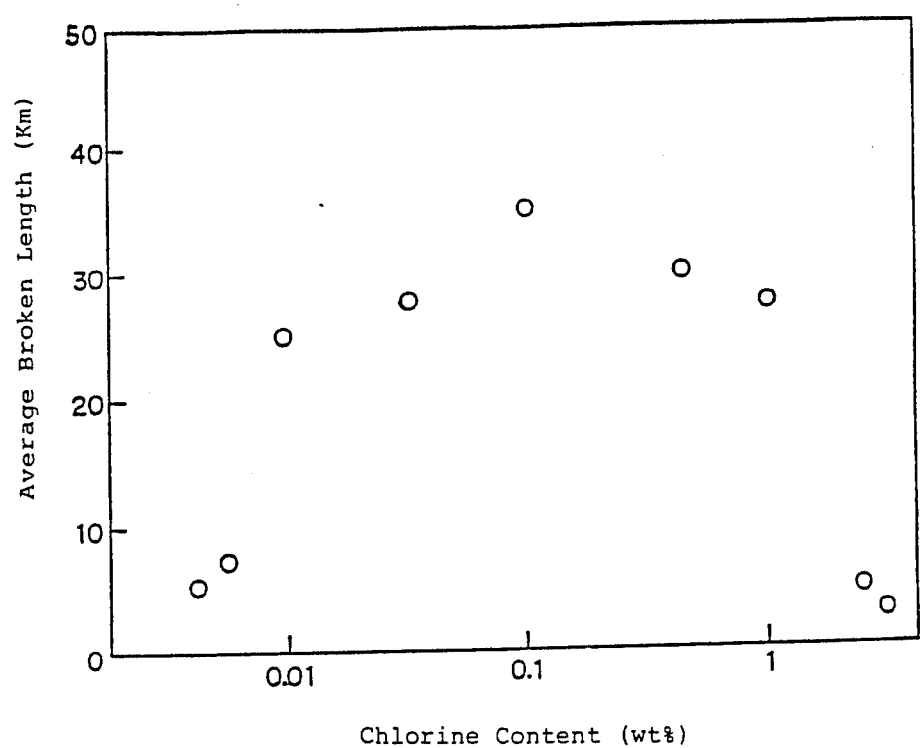

OPTICAL FIBER INCLUDING CHLORINE CONTENT IN CLADDING

FIELD OF THE INVENTION

The present invention relates to an optical fiber and a method for producing the same. More particularly, it relates to a quartz optical fiber with high strength and method for producing the same.

BACKGROUND OF THE INVENTION

Generally, a quartz optical fiber is produced by a modified chemical deposition method (hereinafter referred to as "MCVD" method) or a vapor phase axial deposition method (hereinafter referred to as "VAD" method). The MCVD method comprises forming a cladding layer and a core glass successively on an inner surface of tube made of natural quartz. Therefore, the outermost layer of the optical fiber consists of natural quartz which contains chlorine in an amount less than the limit of detection. Generally, in the VAD method, synthesized core glass is covered with a natural quartz tube so that the outermost layer of the optical fiber contains chlorine in an amount less than the limit of detection.

The quartz optical fibers produced by the above described methods have, however, such poor strength that they have an average broken length of 5 km in a tensile test at elongation of 0.7 %. The poor strength of the optical fiber is due to surface defects.

To eliminate or reduce the probability of break of the optical fiber due to the presence of foreign materials or impurities, it has been proposed to replace the natural quartz tube with a synthetic quartz tube in order to decrease the content of impurities in the optical fiber, or to use a covering made of a glass having a low coefficient of thermal expansion such as $TiO-SiO_2$ type glass. However, such techniques have not been industrially employed.

SUMMARY OF THE INVENTION

One object of the present invention is to provide an optical fiber having improved strength and longer average broken length.

Another object of the present invention is to provide a method for producing an optical fiber which contains a very small amount of chlorine in its surface layer.

BRIEF DESCRIPTION OF THE DRAWING

FIG. is a graph showing relationship between the chlorine content in the surface layer of the optical fiber and the average broken length of the fiber with 1% elongation.

DETAILED DESCRIPTION OF THE INVENTION

These objects can be achieved by a quartz optical fiber comprising a glass cladding made of synthetic quartz and a core in which the surface layer of the cladding contains chlorine in an amount of 0.01 to 1 % by weight, preferably 0.03 to 0.5% by weight.

In the present specification, the term "surface layer" is intended to mean a layer having a thickness of not more than 5 $\mu$m from the surface of the optical fiber. The chlorine content is measured by means of an electron probe micro-analyzer or an X-ray micro-analyzer (XMA).

In the field of the optical fiber production, it is well known that causes of fiber break are deposition of the impurities and/or surface flaws made in the production step of a glass preform for optical fibers and/or in the drawing of the glass preform for fabricating the optical fiber. Therefore, each production step should be carried out in a clean atmosphere to prevent the deposition of the impurities, and the surface layer of the optical fiber should be made of hard glass to prevent surface flaws caused by shock. Surprisingly, it has been found that the addition of chlorine in the surface layer of the quartz optical fiber greatly improves the hardness thereof so that flaws are hardly made on the surface of the optical fiber. Further, it has also been found that, when the content of chlorine in the surface layer exceeds 1 % by weight, the strength of the optical fiber is deteriorated.

The glass preform for the optical fiber according to the present invention may be produced by depositing fine glass particles on a glass preform by flame hydrolysis of a raw material (e.g. $SiCl_4$, $GeCl_4$, $POCl_3$, $BBr_3$, $BCl_3$, $AlCl_3$, etc.) and then treating the preform in an atmosphere containing chlorine preferably at a temperature of 900 to 1,100° C. In order to effectively add chlorine to the layer of the fine glass particles, the bulk density of the layer is preferably less than 1 $g/cm^3$. The concentration of chlorine in the atmosphere is not less than 0.1% by mole. When it is less than 0.1% by mole, chlorine is not added in the surface layer in an intended amount. However, the concentration of chlorine should not exceed 7% by mole. If it is contained in a concentration larger than 7% by mole, bubbles may form in the glass. Therefore, chlorine is diluted with an inert gas such as helium and argon to the desired concentration. In addition to or instead of chlorine, a chlorine-containing compound such as $SOCl_2$ and $CCl_4$ may be used.

The glass preform on which fine glass particles are deposited according to the present invention may be any one that is produced by the conventional MCVD or VAD method.

The glass preform having chlorinated glass particles on its surface is sintered by a conventional method to make it transparent. Typical sintering conditions are as follows:

Temperature: 1,700° C.
Atmosphere: Helium

The transparent glass preform is then drawn in a conventional manner to fabricate an optical fiber. Typical drawing conditions are as follows:

Temperature: 2,100° C.
Drawing rate: 200 m/min.
Atmosphere: Argon

In the drawing step, the glass preform produced according to the present invention does not break so easily as those produced by the conventional methods so that its average broken length can reach 20 km or longer.

The present invention will be hereinafter explained further in detail by following examples.

EXAMPLE 1

To produce a glass preform, a glass core rod made by the VAD method was inserted in a natural quartz tube and then heated to integrate them together to form a preform having a diameter of 24 cm and a length of 50 cm. Over the surface of the formed preform, $SiO_2$ fine particles were deposited to a thickness of 5 cm by injecting $SiCl_4$, $H_2$ and $O_2$ at rates of 500 ml/min., 4 min. and 12 l/min., respectively by means of a concentric multi-nozzle burner according to the VAD method.

The glass preform having deposited $SiO_2$ fine particles was installed in an electric furnace kept at 1,100° C. for 3 hours with introducing helium and chlorine gas at rates of 5 l/min. and 200 ml/min., respectively. Then, it was sintered and drawn at 1,700° C. to fabricate an optical fiber having a diameter of 125 μm. The chlorine content in the surface layer of the optical fiber was 0.5% by weight.

Ten optical fibers each having length of about 120 km were fabricated by the same manner as above and tensioned with 1% elongation. The number of break is 4 per each optical fiber, which was less than one half of the break number found in optical fibers having no surface layer containing chlorine.

EXAMPLE 2

On a carbon made mandrel, $H_2$, $O_2$, $SiCl_4$ and $GeCl_4$ were injected by means of a concentric multi-nozzle burner at following rates to form a layer of glass fine particles corresponding to a core by flame hydrolysis:

$H_2$: 4 l/min.
$O_2$: 12 l/min.
$SiCl_4$: 200 ml/min.
$GECl_4$: 0–200 ml/min.

Thereafter, $H_2$, $O_2$ and $SiCl_4$ were injected at following rates to form another layer of glass fine particles corresponding to a cladding:

$H_2$: 4 l/min.
$O_2$: 12 l/min.
$SiCl_4$: 200 ml/min.

Finally, the injecting rates of $H_2$ and $O_2$ were adjusted to achieve the bulk density of 0.5 g/cm$_3$.

After removing the mandrel, the layers of the glass particles were dehydrated and made transparent in an electric furnace kept at 1,000° C. in which helium and chlorine were introduced at rates of 15 l/min. and 500 ml/min., respectively. The thus produced preform was drawn to fabricate an optical fiber having a diameter of 125 μm and a length of about 10 km. The chlorine content of the surface layer of the optical fiber was 0.03% by weight. Eight optical fibers each having the same length were fabricated by the same manner and tensioned with 1% elongation. The number of break is 3 per each optical fiber, which was less than one half of the break number found in the conventional optical fibers.

In the same manner as in Example 1 or 2, optical fibers having various chlorine contents in the surface layer were produced and their average broken length was measured in the same manner as above. The results are plotted in FIGURE.

What is claimed is:

1. A quartz optical fiber comprising a glass cladding made of synthetic quartz and a core made of natural or synthetic quartz in which the suface layer of the cladding contains chlorine in an amount of 0.01 to 1% by weight.

2. A quartz optical fiber according to claim 1, wherein the chlorine content in the surface layer is from 0.03 to 0.5% by weight.

* * * * *